United States Patent
Waid

(10) Patent No.: US 9,552,750 B2
(45) Date of Patent: Jan. 24, 2017

(54) OVERHEAD SIGN HANGING SYSTEM

(71) Applicant: Kenneth Richard Waid, Georgetown, TX (US)

(72) Inventor: Kenneth Richard Waid, Georgetown, TX (US)

( * ) Notice: Subject to any disclaimer, the term of this patent is extended or adjusted under 35 U.S.C. 154(b) by 0 days.

(21) Appl. No.: 14/882,725

(22) Filed: Oct. 14, 2015

(65) Prior Publication Data

US 2016/0329002 A1   Nov. 10, 2016

Related U.S. Application Data

(60) Provisional application No. 62/158,008, filed on May 7, 2015.

(51) Int. Cl.
| | |
|---|---|
| *G09F 7/00* | (2006.01) |
| *G09F 7/18* | (2006.01) |
| *F16M 13/02* | (2006.01) |

(52) U.S. Cl.
CPC ............... *G09F 7/18* (2013.01); *F16M 13/027* (2013.01); *G09F 2007/186* (2013.01)

(58) Field of Classification Search
CPC ..... G09F 7/18; G09F 2007/186; F16M 13/027
USPC ...... 248/492, 544, 200.1, 295.11, 298.1, 261
See application file for complete search history.

(56) References Cited

U.S. PATENT DOCUMENTS

| | | | | |
|---|---|---|---|---|
| 884,538 | A * | 4/1908 | Thomas | A47G 1/24 |
| | | | | 242/378.4 |
| 2,399,001 | A * | 4/1946 | Chilton | A47H 1/022 |
| | | | | 211/105.6 |
| 8,474,778 | B2 * | 7/2013 | Jacobson | F16M 11/041 |
| | | | | 248/206.2 |
| 2003/0209642 | A1 * | 11/2003 | Fontana | A63B 27/00 |
| | | | | 248/231.91 |
| 2009/0278018 | A1 * | 11/2009 | Park | F16M 11/10 |
| | | | | 248/492 |

* cited by examiner

*Primary Examiner* — Anita M King
(74) *Attorney, Agent, or Firm* — Maribeth McLuch

(57) ABSTRACT

An overhead sign display system is provided for facilitating the hanging of overhead retail signs, banners and the like upon a line stretched across opposing horizontal supports suspended from the ceiling or affixed to an upright support from the floor or other fixture in a safe, efficient and sturdy manner and to provide an efficient way of maintaining tension on the line. The system includes a free floating reel constructed of a rod around which is coiled a line held in place by a spacer, washers and nuts and which is then inserted into a first end of a horizontal support housing such that the line can be stretched taut across and fastened to the opposing support or fixture then tightened by turning the reel in an opposite direction and securing the reel in place inside the housing. Opposing bolts are threaded through the horizontal support or an optional locking sleeve to engage the reel assembly so as to affix the reel assembly in place and maintain tautness of the line.

18 Claims, 7 Drawing Sheets

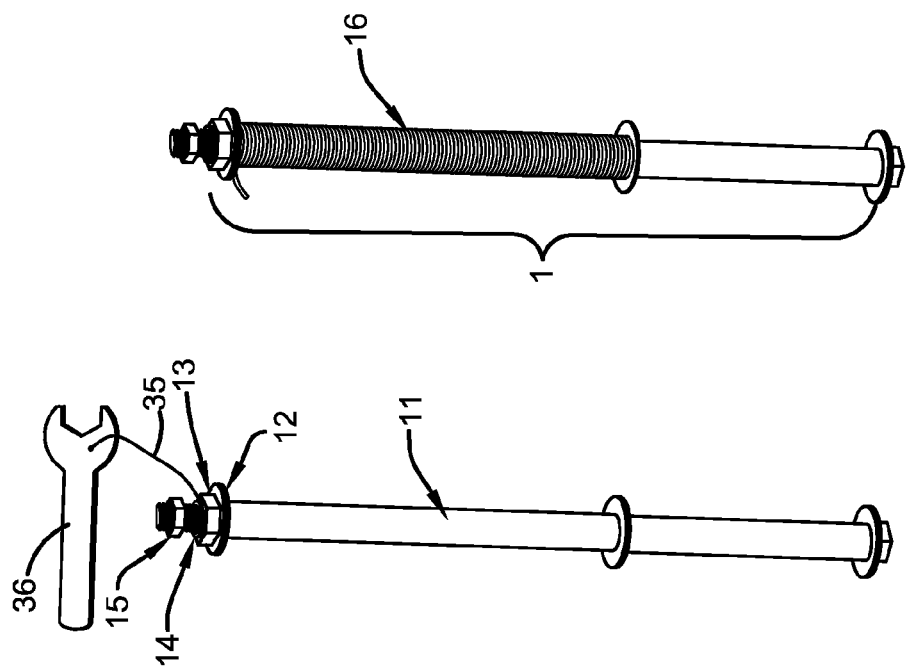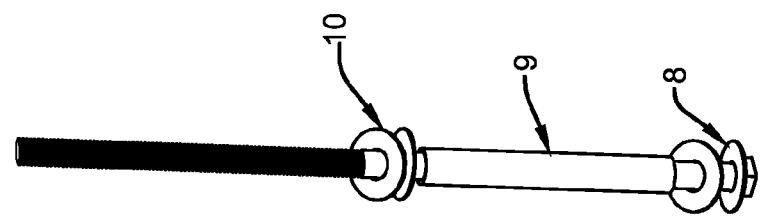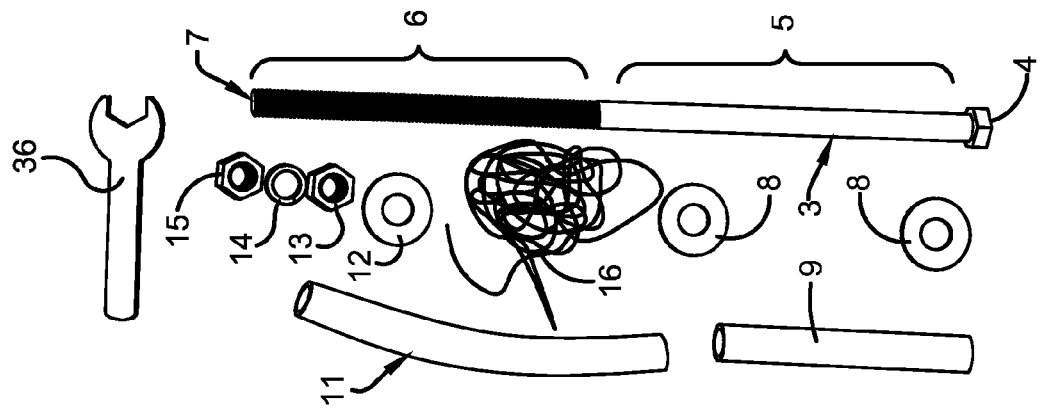

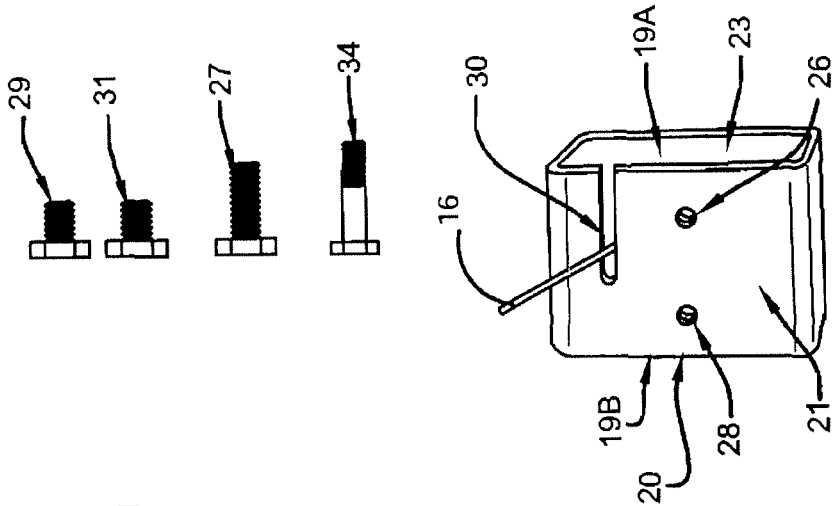
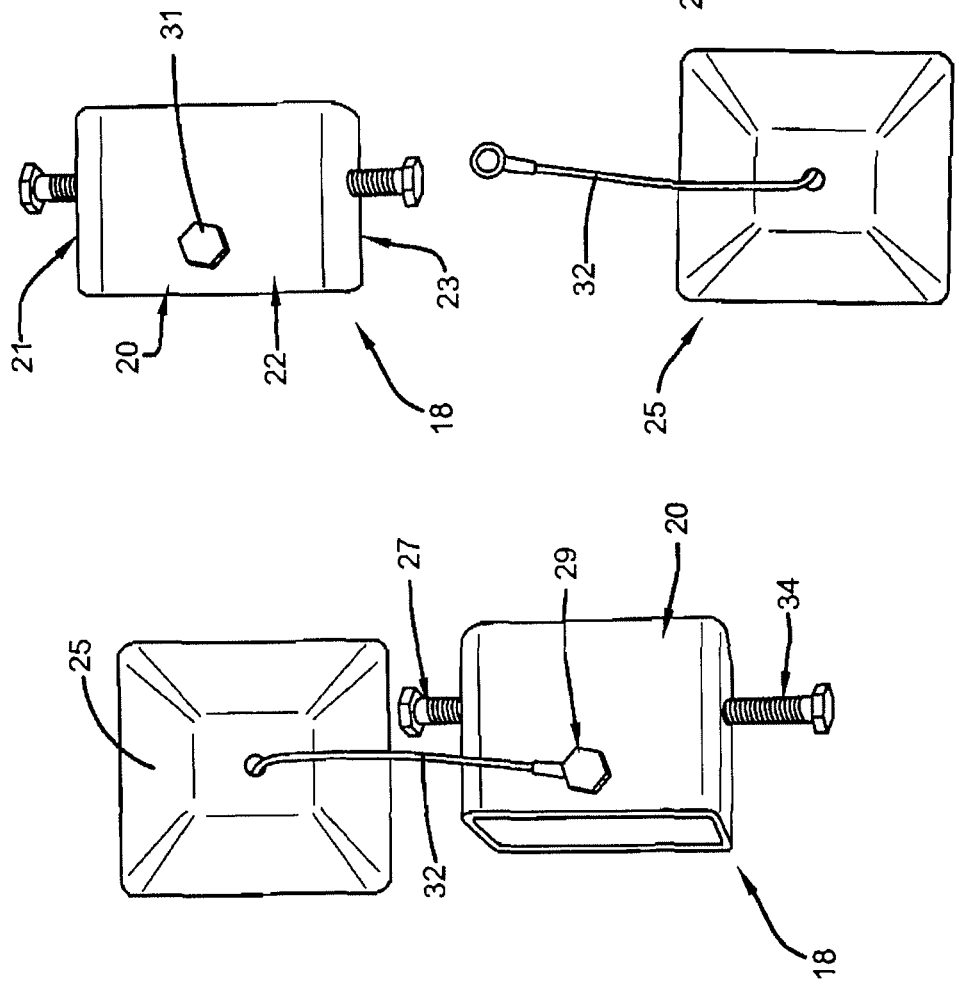

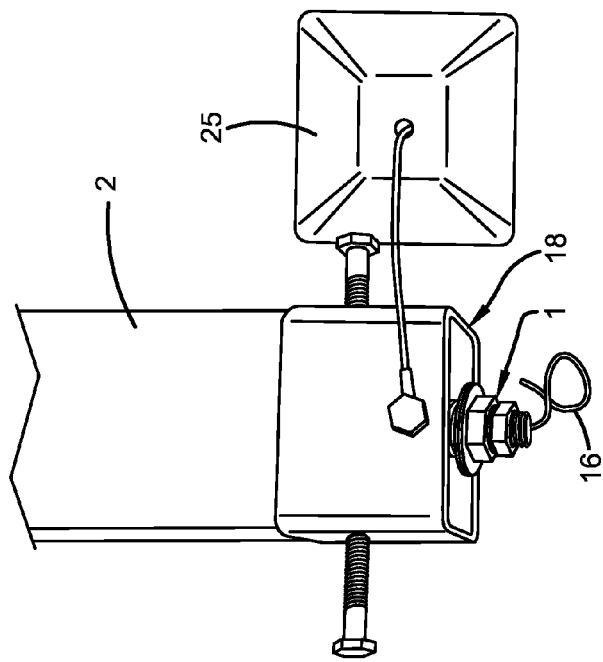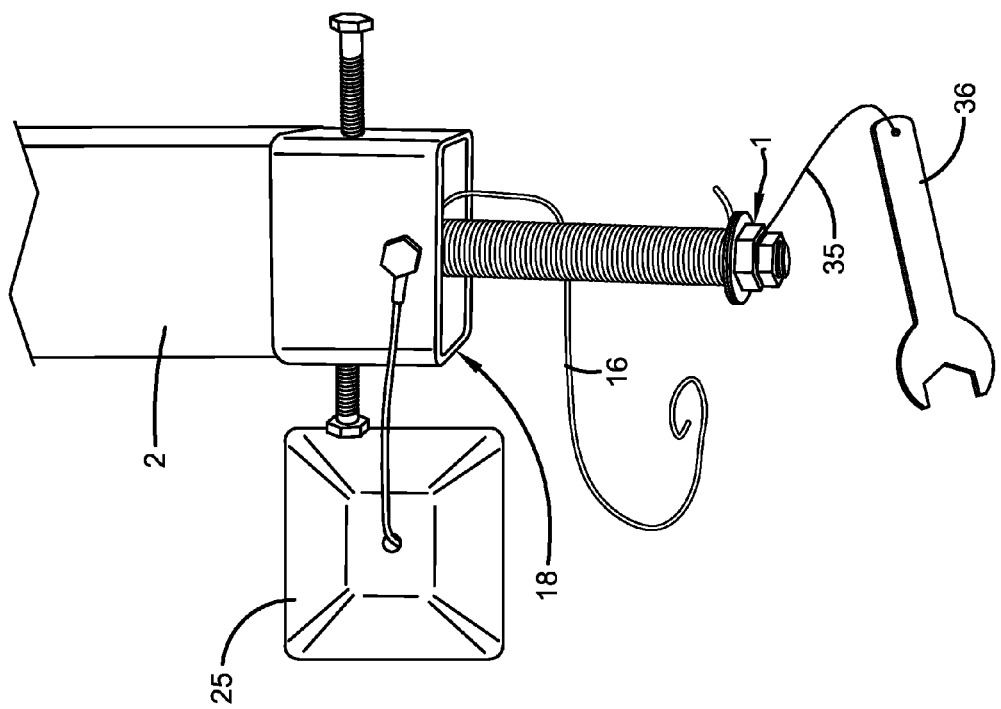

OVERHEAD SIGN HANGING SYSTEM

CROSS-REFERENCE TO RELATED APPLICATIONS

This application claims benefit under 35 U.S.C. §119(e) of Provisional Application No. 62/158,008 filed May 7, 2015, the disclosures of which is incorporated herein by reference in its entirety.

BACKGROUND

This application relates generally to an overhead sign hanging system. An exemplary embodiment of the invention relates primarily to sign displays in retail stores to provide merchandise price and other information to consumers. More particularly, the present application concerns a more facile and efficient overhead hanging sign system that suspends a sign over the merchandise on a wire that allows for less visual clutter from the system, easier installation of a sign and prevents sag of the wire, resulting in increased sales, more effective use of resources such as employee time and reduced costs.

While traditional overhead hanging sign systems exist, enhancements to their efficiency and utilization remain to be realized. For example, currently used in "big box" stores is an overhead sign hanging system that utilizes upright support posts attached to weighted platforms comprised of wrapping a line such as monofilament fishing line around the top of one support post, tying a knot and stretching the line across to another such upright post then again wrapping and knotting the line in the same fashion (See FIG. 1). However, over time the line sags requiring undue effort and time to untie, re-stretch and re-rig the line. Another example includes a similar support system involving a wire stretched between turnbuckles attached on the opposing support posts (See FIG. 2). The wire is stretched by hand as taut as possible using the second turnbuckle as the final stretch. That system requires special tools and needs approximately fifteen minutes to complete. In both of these examples, the process must be repeated with a new wire each time the t-posts are moved or the sign wire sags. The present application overcomes that problem by providing an easier method to tighten the line and remove the sag using a reel assembly with replacement line and a mechanism to turn the reel assembly, thus tightening the line.

SUMMARY

The following is a brief summary of subject matter that is described in greater detail herein. This summary is not intended to be limiting as to the scope of the claims.

One aspect of the exemplary embodiment relates to a novel overhead sign hanging system that provides for objects such as signs and banners to be quickly hung and maintained across a line between two adjacent support posts or other such fixtures. The exemplary embodiment includes the advantages of prior sign supports and many novel features that result in a new sign support system which is not anticipated, rendered obvious, suggested or implied by any of the prior art either alone or in combination thereof.

In one embodiment the sign hanging system is used in conjunction with existing t-posts having a top horizontal hollow bar, a reel assembly comprised of a metal or other rod such as a long bolt upon which is coiled a line of sufficient strength and gauge to support the desired object to be hung, such line coiled on the rod between washers affixed in position on the rod by a standard hexagonal nut, a lock washer and end nut which reel assembly is inserted into the horizontal bar and held in place by a locking sleeve. The line upon which the sign will hang is drawn through the locking sleeve and stretched across the overhead space to an opposing support and affixed thereto. The tautness of the line is set and maintained by turning the end bolt of the reel assembly such as with a wrench. The reel is secured in place by pressure from opposing bolts engaging opposite sides of a hexagonal nut threaded onto the rod. The exemplary embodiment includes an optional cosmetic end cap.

In another embodiment the reel assembly may be utilized without the locking sleeve by inserting it into the end of the horizontal bar and securing it in place with bolts or screws tapped directly into the side walls of the support.

In another aspect of an exemplary embodiment, a sign hanging system is provided that includes a horizontal support member with at least one open end and a reel assembly. The reel assembly is inserted into the open end and includes a rod, a line coiled around the rod, and a stabilizer. The stabilizer is operatively associated with the rod to stabilize the rod inside the horizontal support member. The reel assembly is configured to allow the line to be drawn out from the horizontal support member to a distant location opposed to the support member and affixed tautly in place to a stationary fixture.

In another aspect of an exemplary embodiment, a sign hanging system is provided that includes a horizontal support member with at least one open end a reel assembly inserted into the open end. The reel assembly includes a rod, a line coiled around the rod, and at least a first washer. The rod receives the first washer. The first washer is configured to cooperate with the horizontal support to hold the reel assembly in place inside the horizontal support member but allow the reel assembly to turn to allow the line to be drawn out from the horizontal support member to a distant location opposed to the support member and affixed tautly in place to a stationary fixture.

The objective of the invention is to provide an overhead sign hanging system that is effective and efficient. A further objective is to provide an overhead sign hanging system that is easily constructed and of low cost.

The embodiments may take several forms in various components and arrangements of components and in various procedures and arrangements of procedures. The drawings are only for purposes of illustrating preferred embodiments, they may not be to scale and are not to be in construed as limiting the invention. It is to be understood that the embodiments are not limited in its application to the details of construction and the arrangements of components as set forth herein and as illustrated in the drawings. The invention is capable of other embodiments and of being practiced and carried out in various ways. It is to be further understood that phraseology and terminology used herein are for the purpose of description and should not be recognized as limiting. Other aspects will be appreciated upon reading and understanding the attached figures and description.

BRIEF DESCRIPTION OF THE DRAWINGS

These embodiments will be better understood and objects other than those set forth above will be more apparent when consideration is given to the following detailed drawings.

FIGS. 3A-D are exploded views of the components of the reel assembly and related elements in various states of completion.

FIG. 4A is an exploded view of the components of the locking sleeve and related elements.

FIG. 4B is another exploded view of the components of the locking sleeve and related elements.

FIG. 4C is an exploded view of the components of the locking sleeve

FIG. 5A is a top plan view of the completed reel assembly with the end cap detached.

FIG. 5B is a top plan view of the completed reel assembly with the end cap detached and the reel assembly inserted into the horizontal bar.

DETAILED DESCRIPTION

Figure 1:
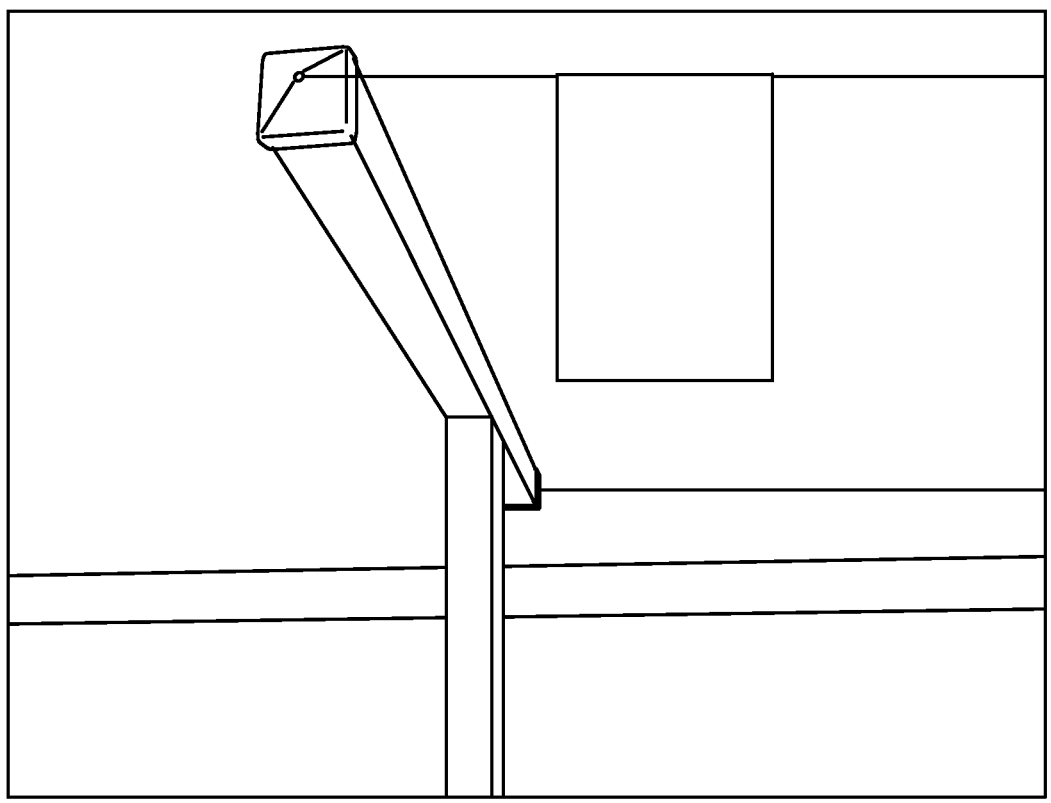
FIG. 1 is a perspective view of an existing sign support system using fishing line tied off on opposing supports.
Figure 2:
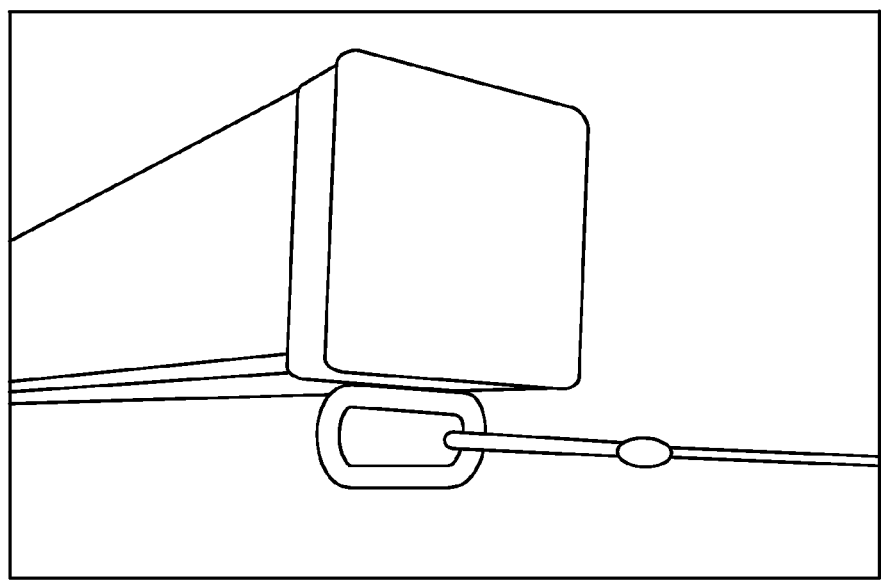
FIG. 2 is a perspective view of an existing sign support system using turnbuckles to attach fishing or other line to suspend the sign.

Referring now to the figures, wherein the drawings are for purposes of illustrating the preferred embodiments of the invention and not limiting the same.

Various methods are provided for hanging overhead signs. One exemplary embodiment of the present invention is versatile and adaptable for use with existing sign hanging systems utilizing opposing support posts such as upright t-bars.

With reference to the figures, FIGS. 3A-D to 7, illustrate the exemplary embodiment. Beginning with FIGS. 3A-D, the exemplary embodiment includes a reel assembly 1 that comprises an elongated rod such as a bolt 3. The bolt 3 has a first end 4 comprising a hexagonal or other bolt end, a first portion 5 extending from the first end 4, and a second portion 6 beginning at some point along the bolt preferably midway and having a threaded or other abraded surface with a second end 7 that may be threaded to accept a nut. A first set of one or more standard washers 8 is of sufficient diameter to approximate the inside diameter of the horizontal bar 2 (FIG. 7) so as to hold the reel assembly 1 in place inside the horizontal bar but still allow the reel assembly to turn and be easily retrieved. The washers 8 are fitted onto the bolt proximate to the first end 4 followed by a hollow spacer 9 comprised of plastic such as acrylonitrile butadiene styrene (ABS) or other lightweight suitable material and of sufficient interior diameter to slide onto the bolt. Washer 10, of sufficient diameter to serve as a backdrop for the line wound on the tube 11 is fitted onto the bolt 3 adjacent to the spacer 9.

A tube 11 made of vinyl or other elastomeric material is fitted over the second end 7 of the bolt 3 and against the standard washer 10. Tube 11 is of sufficient interior diameter to fit snugly over the second portion 6 such that there is sufficient friction that it cannot easily be turned. in place. Tube 11 is followed by a second set of one or more standard washers 12 of equivalent diameter as washers 8, a first hexagonal nut 13, a lock washer 14 and a terminal nut 15 preferably hexagonal or other shape to accept turning by a conventional wrench. The tube extends through the washers 12, 14, and the nits 13, 15 are threadily fastened to the second portion 6. A line 16 of sufficient strength is coiled around the tube 11 beginning at the standard washer 10 and ending before the second set of standard washers 12 leaving a loose end at the terminal end of the rod 7 such that the line can be withdrawn to a distance from the reel assembly and affixed to an opposite support, wall or other stationary item causing a taut line.

Referring to FIGS. 4A-C and 5A-B, the preferred embodiment further includes a locking sleeve 18 made of any suitable material. The locking sleeve 18 comprises a housing 20, preferably square shaped or with straight sides, but of sufficient configuration to accept the horizontal bar 2. The housing 20 has a front open end 19A and back open end 19B, a first side 21, second side 22, third side 23 and fourth side (not shown), and an end cap 25. The horizontal bar 2 may also be tubular in which case the locking sleeve 18 would be of sufficient shape to accommodate the tubular configuration and the sides would be approximate and arranged in radial fashion.

Figure 6:
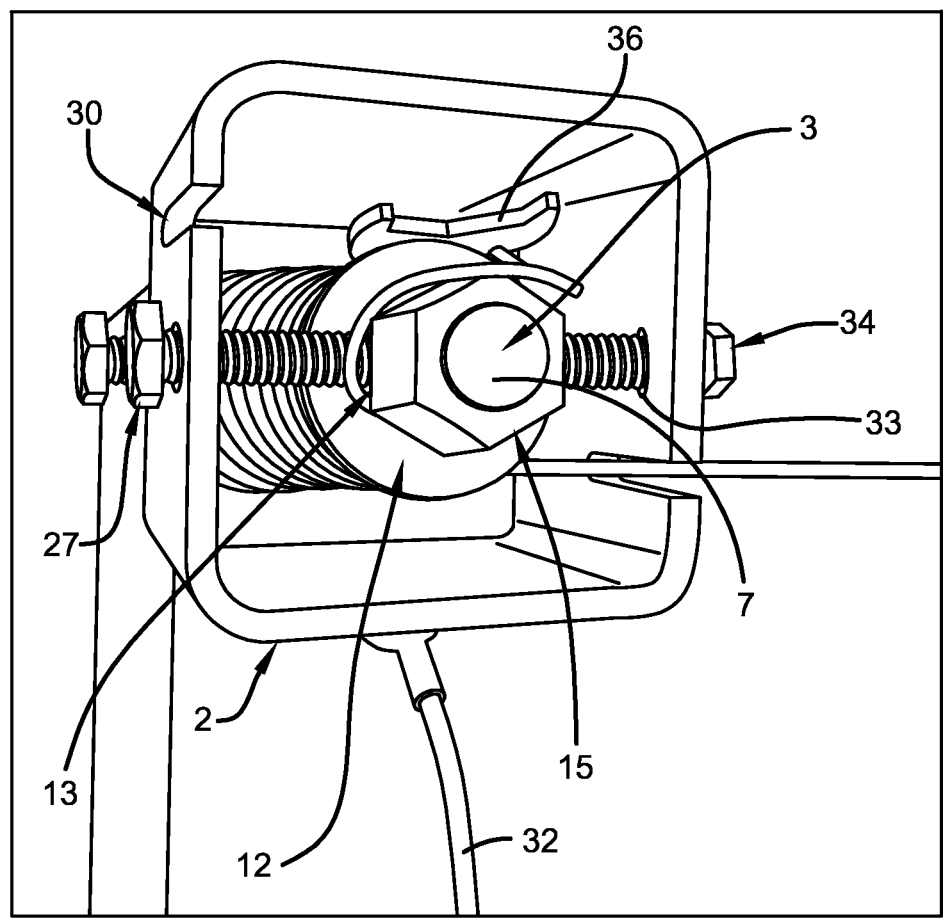
FIG. 6 is a side view of the reel assembly secured within the support housing with the end cap detached.

As seen in FIGS. 4B and 6, the first side 21 includes a first threaded aperture 26 for accepting a first threaded bolt 27, a second threaded aperture 28 for receiving a turn screw 29 to engage the outer surface of the horizontal bar 2 thus tightening the locking sleeve 18 against the horizontal bar post 2 and a slit 30 commencing from the front end 19A of the locking sleeve 18 through the first side 21 extending midway to the center to accept the line 16 from the reel assembly 1. The second side 22 having a third threaded aperture to accept a bolt 31 for attaching a second line 32 (FIGS. 4A and 4B) extended to and attached to the end cap 25. As seen in FIG. 6, the third side 23 has a fourth threaded aperture 33 for accepting a third threaded bolt 34 to secure in place the reel assembly 1 by engaging an opposing flat side of the first hexagonal nut 13 in opposition to the first threaded bolt 27. The third side 23 may also have a similar slit as slit 30 for purposes of use in a different direction.

Figure 7:
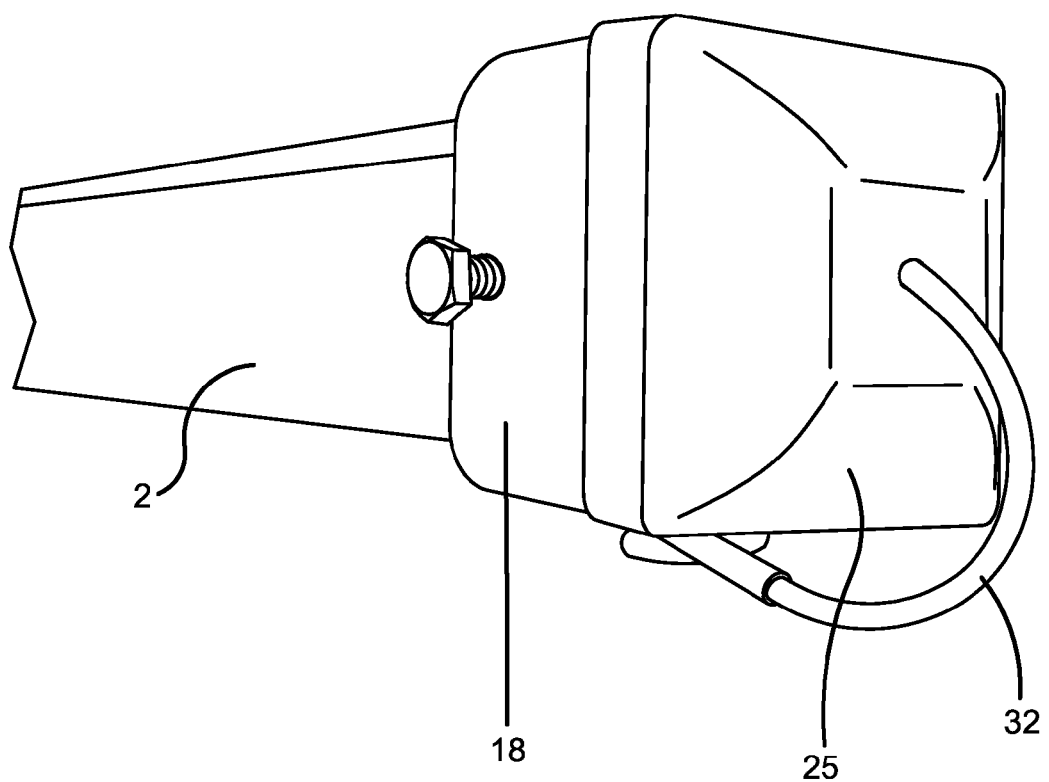
FIG. 7 is a perspective view of the hanging sign system with end cap attached.

Referring to FIG. 7, the end cap 25 is of such diameter or configuration to fit snugly over the locking sleeve 18. It may be locked into place with an optional turn screw 29 (FIG. 4A). Alternately, the locking sleeve may be attached with the line 32 connected to the first or second screw to avoid it dropping to the floor when not in use.

Installation of the sign hanging system involves placing the first end 4 of the reel assembly 1 into the horizontal bar 2, tightening the first threaded bolt 27 and third threaded bolt 34 to fix the reel assembly 1 in place, tightening the turn screw 29 to fix the locking sleeve 18 in place and placing the end cap 25 onto the locking sleeve front end 19A.

The line 16 is extended through the slit 30 and stretched taut and across to a receiving t-bar post or other support structure and affixed thereto by a turnbuckle or other suitable device. The line 16 is then secured in its taut state by twisting the terminal end nut 15 (FIG. 6) with a wrench 36 or other suitable device. In the event the line sags, the tautness can be easily restored by removing the end cap 25, loosening the terminal end nut 15, the first threaded bolt 27 and the third threaded bolt 34, turning the reel assembly 1 in an opposite direction to that for loosening the line 16 and securing the line by tightening first threaded bolt 27 and third threaded bolt 34.

Conversely, the reel assembly 1 can be removed from the horizontal bar 2 and the loose end of the line 16 attached to a support structure and the line is unwound from the reel assembly 1 by holding the spacer 9 and moving towards the horizontal bar 2. Once the line 16 has been unwound of sufficient length the reel assembly 1 is reinserted into the support housing 2 and tightened with a wrench 36 upon the terminal nut 15.

The reel assembly 1 may be rewound by releasing the tension on the line 16, disconnecting the line 16 from the opposing support, pulling the reel assembly 1 out of the horizontal bar 2 to expose the second portion 6, rewinding the entire line 16 either by hand or using the wrench 36.

In another embodiment the first, second, third and fourth threaded apertures can be tapped directly into the sides of the horizontal bar without benefit of the locking member 18.

In another embodiment a third line 35 (FIGS. 5A and 3C) is attached to the lock washer 14 upon which is attached a wrench 36 of sufficient size to engage the terminal hexagonal nut 15 and turn the reel assembly.

In yet another embodiment, the horizontal support member may be suspended from the ceiling.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A sign hanging system comprising:
   a horizontal support member with at least one open end;
   a reel assembly inserted into the open end, the reel assembly comprising:
     a rod;
     a line coiled around the rod;
     a stabilizer, wherein the stabilizer is operatively associated with the rod to stabilize the rod inside the horizontal support member; and
   wherein the reel assembly is configured to allow the line to be drawn out from the horizontal support member to a distant location opposed to the support member and affixed tautly in place to a stationary fixture.

2. The sign hanging system of claim 1, wherein the rod includes a first end, a second end, a first portion, and a second portion, wherein the first end has a larger diameter than the remaining portion of the rod, wherein the sign hanging system further comprises at least a first washer, a spacer, at least a second washer, and an elastomeric tube, wherein the rod receives the first washer, the spacer, the second washer and the elastomeric tube, wherein the first end receives the first washer, wherein the spacer is adjacent the first washer and located between the second end and the first washer, wherein the second washer is adjacent the spacer and located between the spacer and the second end, wherein the elastomeric tube is adjacent the second washer and located between the second washer and second end, wherein the elastomeric tube is configured to grip the rod and not turn relative to the rod, wherein the sign handing system further comprises at least a third washer, a fastener, and a terminal clasp, wherein the fastener is operatively connected to the reel assembly to secure the spacer, the third washer, and the elastomeric tube in place on the rod, wherein the line is coiled around the tube with a loose end at the terminal clasp.

3. The sign hanging system of claim 2 wherein the fastener is a first standard hexagonal nut and the terminal clasp comprises a lock washer and second standard hexagonal nut.

4. The sign hanging system of claim 3, further comprising:
   a locking sleeve, wherein the locking sleeve comprises:
     a housing, wherein the housing has a first open end, a second open end opposed to the first open end, a first side, a second side, a third side and a fourth side,
     wherein the housing is of sufficient size and configuration to slide over the open end of the support member, wherein the first side has a first threaded aperture,
     wherein the third side has a second threaded aperture, wherein at least one of the first side and the third side or both has a slit;
   a first bolt, wherein the first bolt is configured to be threadably inserted into the first aperture such as to engage a first side of the first standard hexagonal nut; and
   a second bolt, wherein the second bolt is configured to be threadably inserted into the second aperture such as to engage the second side opposing the first side of the first standard hexagonal nut so as to affix the reel assembly in place and maintain tautness of the line.

5. The sign hanging system of claim 4, further comprising a third bolt, wherein the locking sleeve has a third threaded aperture on one of the sides, wherein the third bolt is configured to be threadably inserted into the third aperture to abut an exterior side of the exterior of the supporting housing to hold the locking sleeve in place when in use.

6. The sign hanging system of claim 5, further comprising:
   a fourth bolt;
   a wrench;
   a wire;
   wherein the locking sleeve has a fourth threaded aperture on one of the sides,
   wherein the fourth bolt is configured to be threadably inserted into the fourth aperture,
   wherein the wrench is configured to engage a hexagonal nut,
   wherein the wire is attached to the wrench and configured to be attached to the fourth bolt by a looped end so as to retain the wrench in close proximity and available to the user at all times.

7. The sign hanging system of claim 6 further comprising an end cap, wherein the end cap is configured to fit snugly over the locking sleeve.

8. The sign hanging system of claim 1, wherein the horizontal support member is an elongated bar affixed to a vertical post.

9. The sign hanging system of claim 1, wherein the horizontal support member is a horizontal bar suspended from the ceiling.

10. A sign hanging system comprising:
    a horizontal support member with at least one open end;
    a reel assembly inserted into the open end, the reel assembly comprising a rod;
    a line coiled around the rod; and
    at least a first washer, wherein the rod receives the first washer, wherein the first washer is configured to cooperate with the horizontal support to hold the reel assembly in place inside the horizontal support member but allow the reel assembly to turn to allow the line to be drawn out from the horizontal support member to a distant location opposed to the support member and affixed tautly in place to a stationary fixture.

11. The sign hanging system of claim 10, wherein the rod includes a first end, a second end,
    a first portion, and a second portion, wherein the first end has a larger diameter than the remaining portion of the rod, wherein the sign hanging system further comprises, a spacer, at least a second washer, and an elastomeric tube, wherein the rod receives the spacer, the second washer and the elastomeric tube, wherein the first end receives the first washer, wherein the spacer is adjacent the first washer and located between the second end and the first washer, wherein the second washer is adjacent the spacer and located between the spacer and the second end, wherein the elastomeric tube is adjacent the second washer and located between the second washer and second end, wherein the elastomeric tube is configured to grip the rod and not turn relative to the rod, wherein the sign handing system further comprises at least a third washer, a fastener, and a terminal clasp, wherein the fastener is operatively connected to the reel assembly to secure the spacer, the third washer, and the elastomeric tube in place on the rod, wherein the line is coiled around the tube with a loose end at the terminal clasp.

12. The sign hanging system of claim 11 wherein the fastener is a first nut and the terminal clasp comprises a lock washer and second nut.

13. The sign hanging system of claim 11, further comprising:
  a locking sleeve, wherein the locking sleeve comprises:
    a housing, wherein the housing has a first open end, a second open end opposed to the first open end, a first side, a second side, a third side and a fourth side,
    wherein the housing is of sufficient size and configuration to slide over the open end of the support member, wherein the first side has a first threaded aperture,
    wherein the third side has a second threaded aperture, wherein at least one of the first side and the third side or both has a slit;
  a first bolt, wherein the first bolt is configured to be threadably inserted into the first aperture such as to engage a first side of the first nut; and
  a second bolt, wherein the second bolt is configured to be threadably inserted into the second aperture such as to engage a second side opposing the first side of the first nut so as to affix the reel assembly in place and maintain tautness of the line.

14. The sign hanging system of claim 13, further comprising a third bolt, wherein the locking sleeve has a third threaded aperture on one of the sides, wherein the third bolt is configured to be threadably inserted into the third aperture to abut an exterior side of the exterior of the supporting housing to hold the locking sleeve in place when in use.

15. The sign hanging system of claim 14, further comprising:
  a fourth bolt;
  a wrench;
  a wire;
  wherein the locking sleeve has a fourth threaded aperture on one of the sides,
  wherein the fourth bolt is configured to be threadably inserted into the fourth aperture,
  wherein the wrench is configured to engage a nut,
  wherein the wire is attached to the wrench and configured to be attached to the fourth bolt by a looped end so as to retain the wrench in close proximity and available to the user at all times.

16. The sign hanging system of claim 15 further comprising an end cap, wherein the end cap is configured to fit snugly over the locking sleeve.

17. The sign hanging system of claim 10, wherein the horizontal support member is an elongated bar affixed to a vertical post.

18. The sign hanging system of claim 10, wherein the horizontal support member is a horizontal bar suspended from the ceiling.

* * * * *